United States Patent [19]

Jonsson

[11] 4,212,590
[45] Jul. 15, 1980

[54] METHOD AND APPARATUS FOR THE CONTINUOUS REGULATION OF ROTARY HYDRODYNAMIC PUMPS

[75] Inventor: Arne F. Jonsson, Hagfors, Sweden

[73] Assignee: Pumpex Production AB, Bandhagen, Sweden

[21] Appl. No.: 963,122

[22] Filed: Nov. 22, 1978

Related U.S. Application Data

[63] Continuation-in-part of Ser. No. 785,107, Apr. 6, 1977.

[30] Foreign Application Priority Data

Nov. 24, 1977 [SE] Sweden .............................. 7713324

[51] Int. Cl.² ........................................... F04B 49/00
[52] U.S. Cl. ...................................... 417/24; 417/40; 417/42; 417/43
[58] Field of Search ...................... 417/15, 24, 22, 23, 417/38, 40, 42, 43, 45, 47, 366; 415/17, 24, 30

[56] References Cited

U.S. PATENT DOCUMENTS

| | | |
|---|---|---|
| 3,834,830 | 9/1974 | Johncock ............................ 415/17 X |
| 3,930,743 | 1/1976 | Stern ................................. 417/24 X |
| 3,935,707 | 2/1976 | Murphy et al. ..................... 417/24 X |

Primary Examiner—Carlton R. Croyle
Assistant Examiner—Edward Look
Attorney, Agent, or Firm—L. Lawton Rogers, III

[57] ABSTRACT

A regulator for controlling the speed of a rotary hydrodynamic pump algebraically sums a preselected value with a signal related to the pump speed and raised to a predetermined power. A root of the combined signals is compared with a flow rate or liquid level signal to develop a pump speed control signal. In the mechanical embodiments of the regulator, the algebraic summation is performed by the force of a spring against a fluid pressure, and the root of the resulting signal is obtained by means of an appropriately shaped cam. Electronically, the root signal is developed with an RC circuit.

16 Claims, 5 Drawing Figures

METHOD AND APPARATUS FOR THE CONTINUOUS REGULATION OF ROTARY HYDRODYNAMIC PUMPS

CROSS REFERENCE TO RELATED APPLICATION

This application is a continuation-in-part of copending application Ser. No. 785,107, filed Apr. 6, 1977.

BACKGROUND OF THE INVENTION

This invention relates to a method and apparatus for the continuous regulation of rotary hydrodynamic pumps which can be driven at variable speeds.

Several forms of variable speed pumps are known in the art. In such pumps, the speed is controlled by means of a speed regulator in accordance with a command variable. The purpose of the control may be to maintain the pump pressure constant, to maintain the level in an elevated tank constant, or to maintain a constant flow rate, for example. In some cases a parameter in a process, such as the temperature of a thermal process or the concentration of some substance in a chemical or biological process, may be used as the command variable.

In order to achieve or to increase the required stability of a control system, it is generally known to provide a strong feed-back signal related to the quantity to be controlled, i.e., the pump speed in the present instance. The pump speed is usually measured electrically, e.g., by a tachometer generator, or in an indirect electrical manner, e.g., by means of photocells and a rotatable disc having black and white fields. When the primary purpose of the pump is the transfer of liquid, i.e., when the pressure created is incidental, a feed-back signal related to the pump flow rate may be the means of stabilizing the control system. In such a case, the flow rate has to be measured hydraulically or electrically by means of the pressure drop in a venturi pipe or in an orifice plate, with the aid of a device commonly called a dp-cell. The flow rate may also be measured by means of other types of flow meters based, for example, on a magnetic, capacitative or ultrasonic effect.

Certain special cases of control systems for rotary, hydrodynamic, variable speed pumps are known. For example, there are known controlled pump units which automatically adapt their performance in accordance with the instantaneous conditions in systems where the control requirement depends on the opening and closing of valves at arbitrary positions in the pipe system. A specific example of such a pipe system is a system for the distribution of drinking water, where pump operation is controlled in accordance with the opening or closing of one or several tap valves. The automatic control effect in such a system is obtained by means of a control system having a piston which senses the pressure drop across a minor restriction (i.e., a quantity proportional to the square of the flow rate) and which is biased by a force from a weight or a spring. This force corresponds to the static head of the whole pump system, i.e., the sum of the differences in the geodetic head and the pressure head between the locations of liquid transfer.

Since the measurement of the liquid flow with sufficient accuracy in a flowmeter is very expensive or may, in practice, be impossible to perform, e.g., due to pollution of the liquid, electronic systems using indirect measurement have been designed. In such systems, the pump speed is measured electrically, whereafter the square of the signal is obtained electronically and thereafter reduced by a term corresponding to the static head of the pump system. The signal obtained in this way is then at least approximately proportional to the square of the flow rate and is used for a feed-back signal in the control system.

OBJECTS AND SUMMARY OF THE INVENTION

With a view toward refining the feed-back signal using indirect measurement and toward reducing the cost of such systems, the present invention provides an improved method of continuously regulating the speed of a rotary hydrodynamic pump in dependence on a selected reference parameter. In its broadest aspects, the control method of the present invention comprises the steps of:

(a) sensing, by means of a first sensor, one of two values, acutal and desired, of one of two parameters, pump speed (n) and flow rate (g);

(b) sensing, by means of a second sensor, the other of said values of the other of said parameters;

(c) generating an altered signal proportional to a selected power of the parameter sensed by the first sensor;

(d) generating a comparison signal proportional to the parameter sensed by the second sensor;

(e) algebraically adding a selected term to the altered signal to produce a modified signal;

(f) extracting a root of a selected power from the modified signal to produce a converted signal;

(g) feeding said converted and comparison signals into a comparator and obtaining an error signal; and (h) feeding said error signal into a speed regulator for the pump.

Each of the recited operations can be executed in a separate step, or two or more of them can be executed in one single step, as will be shown hereinafter. Furthermore, the altered signal may be produced directly in one step in a suitable unit, or in two steps by first producing in a first unit a report signal proportional to the sensed variable and then raising it to the selected power in a second unit to produce therefrom the altered signal. By algebraic addition is meant an addition with respect to the sign of the signal, i.e., reducing as well as summing.

It will be apparent that the converted signal will always vary in the same sense (increase or decrease) as the respective altered signal, but in a relation which will depend on the ratio between the power selected for producing the altered signal and the root power selected for producing the converted signal. Said relation may therefore be described as either sub-proportional or over-proportional, in dependence on which power is greater.

The selected algebraic addition term is exponentially proportional to the ratio between the static head (as herebefore defined) of the pump system in which the regulated pump works, and the pump head of the pump at zero flow rate (shut-off head). This term is advantageously variable for adjustment to specific head values.

The desired value of q (flow rate) may be derived from the height or level of the liquid to be pumped in a container or reservoir.

In the method of pump speed regulation according to the present invention, the following four combinations of parameters can be utilized:

| Parameter which is sensed by the first sensor, processed into an altered, modified and converted signal, and fed into the comparator | Parameter which is sensed by the second sensor, and fed into the comparator |
|---|---|
| actual value of q | desired value of n |
| desired value of q | actual value of n |
| actual value of n | desired value of q |
| desired value of n | actual value of q |

The pairs of terms on the horizontal lines in the table indicate the parameters which in each of the four combinations are considered in the generation of the error signal. It will be readily apparent that a relationship which may be called "double diagonal opposition" prevails between the terms on each horizontal line, one of the values of the one quantity being always paired with the other value of the other quantity.

All signal processing operations can be carried out in conventional electronic devices well known in the art for the respective purposes noted. A convenient, non-electrical signal processor for the specific purposes of the present invention will be described hereinafter. First, however, the theoretical background of the indirect determination of the pumped flow rate generally, and that of the method according to the present invention more specifically, will be explained.

The following relationship applies to a flow rate q through a pipe system at a pressure head h:

$$h = h_s + k_1 \times q^2 \qquad (1)$$

where $h_s$ is the static head and $k_1$ is a positive constant. At constant speed, the characteristic of a rotary hydrodynamic pump may be expressed approximately by the equation $$H = H_o - k_2 Q^2 \qquad (2)$$

where:
H = the pump head at constant speed and at zero flow rate (viz. the flood point of the pump),
Q = the flow rate of the pump at constant speed,
$k_2$ = a positive constant.

When the value n of the pump speed is variable, the following general relationship is obtained by adapting what are called the affinity laws:

$$h = k_3 \times n^2 \times H_0 - k_4 \times q^2 \qquad (3)$$

where:
h = the pump head at the speed n and the flow rate q,
q = the flow rate of the pump at the value n of speed, and $k_3$ and $k_4$ are positive constants.

At a point of operation the pump head equals the pressure head required of the pipe system, which gives $$h_s + k_1 \times q^2 = k_3 \times n^2 \times H_0 - k_4 \times q^2 \qquad (4)$$

Solving for q from this relationship, the following equation is obtained:

$$q = \sqrt{\frac{H_0}{k_1 + k_4} \times \left( k_3 n^2 - \frac{h_s}{H_0} \right)} = \qquad (5)$$

$$k_5 \times \sqrt{k_3 n^2 - \frac{h_s}{H_0}} = k_5 \times \sqrt{A},$$

where $k_5$ is a new constant and $A = k_3 n^2 - h_s/H_0$.

The refinement proposed by the present invention is obtained partly by extracting the square root or a root of other power in accordance with the above relationship, due to the fact that the negative term $-h_s/H_0$ is variable for different values of the static head $h_s$ with respect to the shut-off point $H_0$ of the pump, in accordance with the conditions prevailing in any particular pump installation.

In a first specific embodiment, the method according to the present invention comprises the operations of:

(a) sensing by a first sensor one of the two values: actual or desired, of the pump speed;

(b) sensing by a second sensor the other of the said values of the flow rate;

(c) generating (directly or via a proportional report signal) an altered signal corresponding to a selected power greater than +1 of the quantity sensed by the first sensor, and generating a comparison signal proportional to the quantity sensed by the second sensor means;

(d) reducing the altered signal by a selected term to produce a modified signal;

(e) extracting a root greater than +1 from the modified signal to produce a converted signal;

(f) feeding said converted and comparison signals into a comparator and to obtain an error signal; and (g) feeding said error signal into the speed regulator of the pump being regulated.

As previously stated, two or more operations can be effectuated in one step, or each operation in a separate step. The same applies also for any other method modification discussed hereinafter.

By obtaining an inverse function of equation (5), the following equation for the pump speed n will be obtained:

$$n = \sqrt{\frac{1}{k_3} \times \left( \frac{q^2}{k_5^2} + \frac{h_s}{H_0} \right)} \qquad (6)$$

Consequently, a refinement of the regulation process can also be achieved by adding to the square (or other power) of the actual or desired value of the flow rate q a term $h_s/H_0$, and then extracting a square root (or a root with some other power) therefrom.

A practical method for control will be obtained by replacing the terms $n^2 - h_s/H_0$ in equation (5) by $q^2 + h_s/H_0$. A control circuit can then be set up in which the actual or desired value for q is processed and compared with the other value for n.

Consequently, the method according to the present invention comprises, in a second specific embodiment thereof, the operations of:

(a) sensing by a first sensor one of the two values, actual or desired, of the flow rate;

(b) sensing by a second sensor the other of the said values of the pump speed;

(c) generating (directly or via a report signal) an altered signal corresponding to a selected power greater than +1 of the quantity sensed by the first sensor, and generating a comparison signal proportional to the quantity sensed by the second sensor;

(d) augmenting the altered signal by a selected term to produce a modified signal;

(e) extracting a root greater than +1 from the modified signal to produce a converted signal;

(f) feeding said converted and comparison signals into a comparator to obtain an error signal; and (g) feeding said error signal into the speed regulator of the pump being regulated.

The stepwise procedure for obtaining the required signal transformation can be done in fewer steps or in a single one-step operation by vectorial addition or subtraction of the signals, as described previously. This will be explained more in detail hereinafter.

From a consideration of the following detailed description and the earlier described stepwise mode of operation, it will be apparent that an essential feature of the present invention consists of the addition or subtraction of at least one term raised to a power greater than +1 with another term which has been raised to a power lying between 0 and +1, i.e., from which a root greater than +1 has been taken.

A signal processing device for carrying out, in separate steps, the method according to the present invention comprises, in combination:

(a) a power raising unit adapted to produce from one of the sensed parameters a report signal proportional to a sensed quantity and an adapted signal corresponding to a slected power of the sensed quantity;

(b) an algebraic addition unit adapted to receive said altered signal and to modify it into a modified signal by algebraic addition of a selected term;

(c) a root extracting unit adapted to receive said modified signal and to extract therefrom a root greater than +1 to obtain a converted signal;

(d) a comparator unit adapted to receive said converted signal and a comparison signal and to produce therefrom, in a feed-back process, an error signal;

(e) first interconnection means for feeding a preselected value into the power raising unit, for conveying signals therefrom to the algebraic addition unit, for conveying signals from the algebraic unit to the comparator unit, and for conveying an error signal from the comparator unit; and (f) second interconnection means for conveying said comparison signal to the comparator unit.

Preferably, a setting means is connected to or included in said algebraic addition unit for adjusting a desired value of the selected term, such as the ratio between the static head of the pump system and the shut-off head of the pump being regulated.

In a signal processing device for carrying out the method of the present invention in fewer steps than the noted operations, two or more of the above units can be incorporated together.

All said units and parts can be defined by conventional electronic and electrical devices well known in the art for the specified purposes noted. In some instances, however, it may be desirable to be independent from the supply of electrical energy.

According to the present invention, a non-electrical signal processor and regulator comprises, in combination:

(a) mechanical means for providing a pump speed signal related in value to the pump speed;

(b) mechanical means providing a set point related in value to a ratio between a static head of a pump system and a head of the pump at zero flow; and (c) mechanical means for generating the flow rate signal responsive to a root of a quantity $A'$ which is proportional to a power of the value of the pump speed signal reduced by the value of the set point.

Preferably, in said generating means, a force proportional to the quantity $A'$ acts on a lever pivotally journalled in a fixed part of the regulator, and the lever is provided with a contacting element for abutment against, and for displacement of, a cam surface having a profile of such shape that the displacement obtained corresponds to a root determination. Furthermore, the displacement obtained by the root determination is directed substantially perpendicular to the input quantity from which the root is to be determined and the contacting element preferably comprises a roller journalled in a bearing.

The signal related in value to the pump speed may be a pressure in a flowing liquid proportional to a power such as the square of the pump speed, and said pressure, in said generating means, acts on one side of a valve flap via an inlet channel. Said set point providing means includes means for adjustably biasing the other side of the flap, and the biased side of the valve flap is connected to a by-pass conduit provided with a restriction and leading to a discharge conduit, whereby the pressure at the biased side of the valve flap becomes proportional to the quantity $A'$, said quantity being defined by the power of the pump speed reduced by a term corresponding to said set point. A spring may be provided to bias said flap. The pressure at the biased side of the valve flap and the pressure in the discharge conduit can act on either side of a flexible element, disposed in a sealed chamber, and extending out of the chamber by means of a flexible sealed rod, whereby the force acting on the said rod becomes proportional to the quantity $A'$. Said flexible element may be in the form of a diaphragm.

When the signal related in value to the pump speed is a fluidic signal proportional to the square of the pump speed, said generating means can include a pivotably mounted arm and a diaphragm for applying the fluidic signal to an end portion of said arm. Said set point providing means can include spring means for applying a force to the end portion of said arm, said force being related in value to the set point in a direction generally opposite to the force applied by the fluidic signal whereby a force proportional to the quantity $A'$ acts on said arm.

DETAILED DESCRIPTION OF THE DRAWINGS

Figure 1:
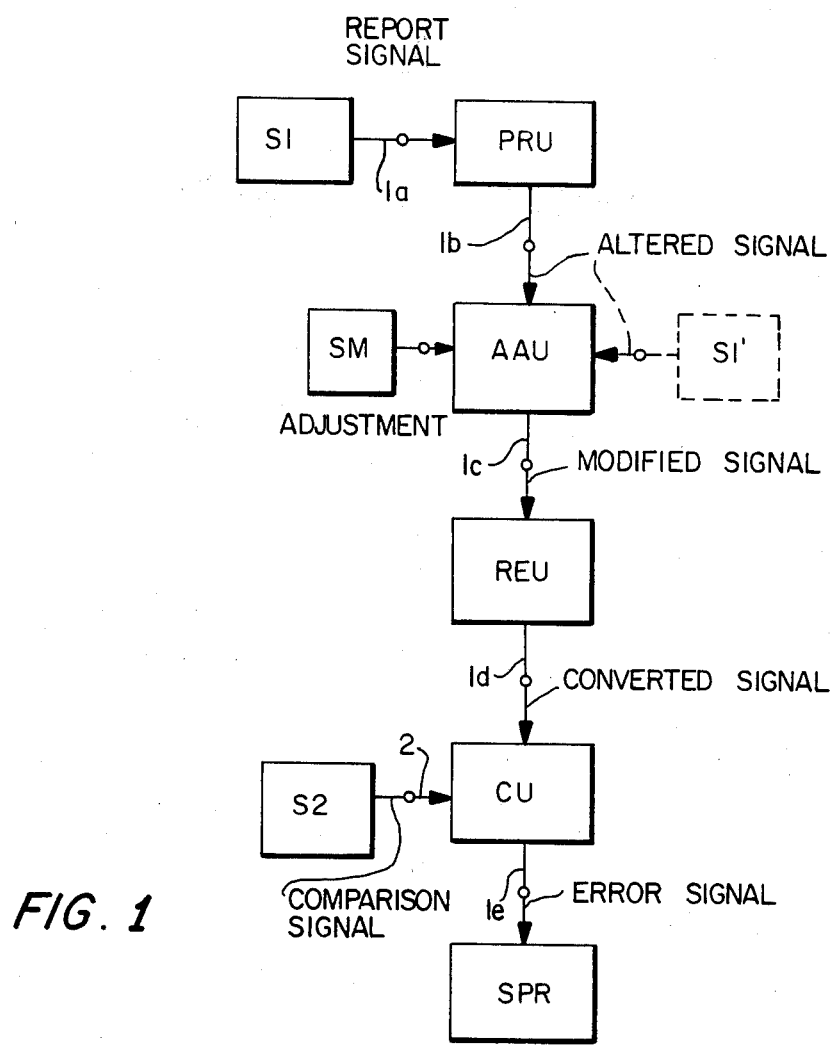
FIG. 1 is a block representation of a signal processor according to the present invention, applicable to electronic as well as to non-electrical embodiments.

Referring to FIG. 1, from a first sensor S1 which, for example, can be defined by the conventional photocell arrangement mentioned in the introduction, a report signal is obtained which is conveyed to a power raising unit PRU by means of a first portion 1a of an interconnecting means. The power raising unit PRU is adapted to produce an altered signal proportional to a selected power of the received report signal. Said altered signal is conveyed to an algebraic addition unit AAD by a second portion 1b of said first interconnecting means. The algebraic addition unit AAD is adapted to produce a modified signal from the altered signal by adding thereto or subtracting therefrom, as the case may be, a preselected term as defined above. Setting means SM are provided to allow a desired setting or adjustment of said term. By a third portion 1c of said first interconnecting means, the modified signal is conveyed to a root extraction unit REU adpated to process it into a converted signal by root extraction with a selected power. By a fourth portion 1d of said first interconnecting means, said converted signal is conveyed to a comparator unit CU.

A comparison signal is generated by a second sensor means S2, such as a level indicator which, via a second interconnection means 2 is fed into the comparator unit CU, where it is compared, preferably in a feed-back process, with the converted signal. This comparison results in the formation of an error signal which is conveyed, as a control signal by the fifth portion 1e of the first interconnecting means, to the speed regulator SPR which governs the speed of the pump in a known manner.

Alternatively, and as shown in dashed lines in FIG. 1, the first sensor S1 and the power raising unit PRU can be merged into a single unit to form a sensor S1' which directly produces an altered signal corresponding to a selected power of the sensed quantity.

When using electronic signal processing units, the interconnecting means are electrical connections and the signals are electrical signals. As will be appreciated after a study of the mechanical processor embodiments according to FIGS. 2 and 3, the interconnecting means can be defined by ducts and levers.

Figure 2:
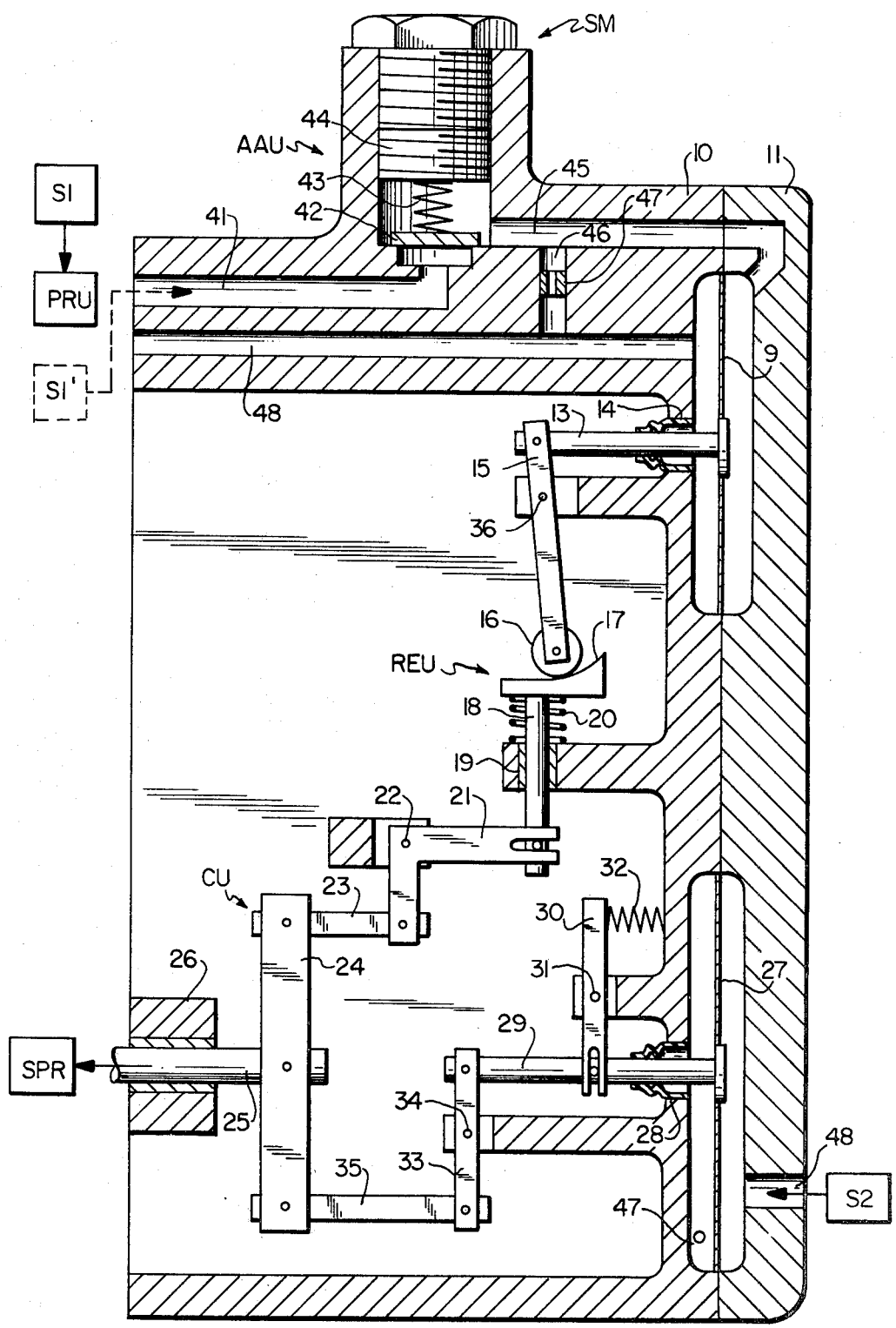
FIG. 2 is a cross-sectional view through a signal processor according to the present invention in a non-electrical embodiment thereof, functional equivalents to processing units according to FIG. 1 being also desigignated by references used in FIG. 1.

Referring now to FIG. 2, a liquid pressure signal proportional to the pump speed is obtained from a pump speed sensor S1 and a power raising unit PRU. Alternatively, the altered signal can be directly obtained from a speed sensor S1' which for example, can be defined by a small auxilliary pump of the centrifugal type which is connected to the shaft of the main pump. This pressure is supplied to an inlet channel 41 and is allowed to act on the lower side of a valve flap 42. The other side of the flap is biased by a spring 43 whose tension may be adjusted by means of a screw 44 comprising the setting means SM. From the valve, the liquid flows through a channel 45 and a bypass conduit 46, provided with a restriction 47, out of the regulator through a discharge conduit 48. The pressure difference between the channels 45 and 48, i.e., the modified signal, will be proportional to a quantity A' which in turn is proportional to the square of the speed of the main pump, the altered signal, reduced by a term corresponding to the force biasing the valve flap. This force may be settable by means of the screw 44.

The pressure in both the channels 45 and 48 is allowed to act on both sides of a diaphragm 9, or a bellows, sealingly located between a housing 10 and a cover 11 of the housing. The diaphragm 9 is provided with a rod 13 sealed against the housing by means of a bellows 14. The force acting on the rod will be proportional to the quantity A'.

The rod 13 acts on a lever 15 pivotally journalled in the housing at 36. The other end of the lever is provided with a contact element defined by a roller 16 which is journalled in the lever. The roller may operate against a curvature 17 attached to a rod 18 journalled in the housing at 19. The curvature has a profile corresponding to the square root of the quantity A' or some other profile corresponding to roots of other, e.g. higher, powers. It will be appreciated that any mathematical function which approximates the said functions may be used.

The fact that the rod 18 in the drawing is journalled for vertical movement whilst the roller 16 essentailly performs a horizontal movement, i.e., that the movements are perpendicular to each other, is of very great practical importance for reducing the effect of friction. Otherwise, there would be a risk of self-restraint even in the "zero position". The movement of the curvature is determined by a force equilibrium between a spring 20 and the force from the diaphragm 9. As an alternative to the bearing 19, the rod 18 may be suspended by two thin steel strips, flexibly and without friction.

The rod 18 is connected to a bell crank lever 21 pivotally journalled in the housing at 22. Via a link 23 a connection to a balance bar 24 may be obtained. The balance bar is pivotally suspended on a rod 25 slidably mounted in a slide bearing 26 in the housing 10, or alternatively flexibly suspended in the same way as was suggested for the rod 18. At its other end, the rod 25 is connected to a speed regulator SPR (not shown) for adjustment of the pump speed.

A comparison signal is obtained from a second sensor means S2 and, defined, for example, by a pneumatic signal obtained from the sensor. The signal, for example, may be proportional to the level in a liquid container, which, in turn, is proportional to the pump flow rate. The signal is supplied through a channel 18 to the right hand side of a second diaphragm 27. The left hand side of the diaphragm may be vented to atmosphere via a port 47. The diaphragm 27 is provided with a rod 29 sealed by means of a bellows 28. The force from the diaphragm 27 is balanced against the force from a spring 32 by means of a lever 30 pivotally journalled in the housing at 31. By means of the rod 29, a lever 33 pivotally journalled at 34, and a link 35, movement proportional to the pneumatic comparison signal may be obtained at the other end of the balance bar 24.

Due to the fact that the altered signal processed in the devices 9 to 23 and 41 to 48 is fed back with respect to the comparison signal, the stability of the regulation is increased. The processor or regulator may be so designed that the pumped flow will be proportional to the comparison signal. At instrument indicating the magnitude of this signal may be calibrated in terms of flow rate. Thus the system may readily be developed for indicating the volume pumped.

Figure 3:
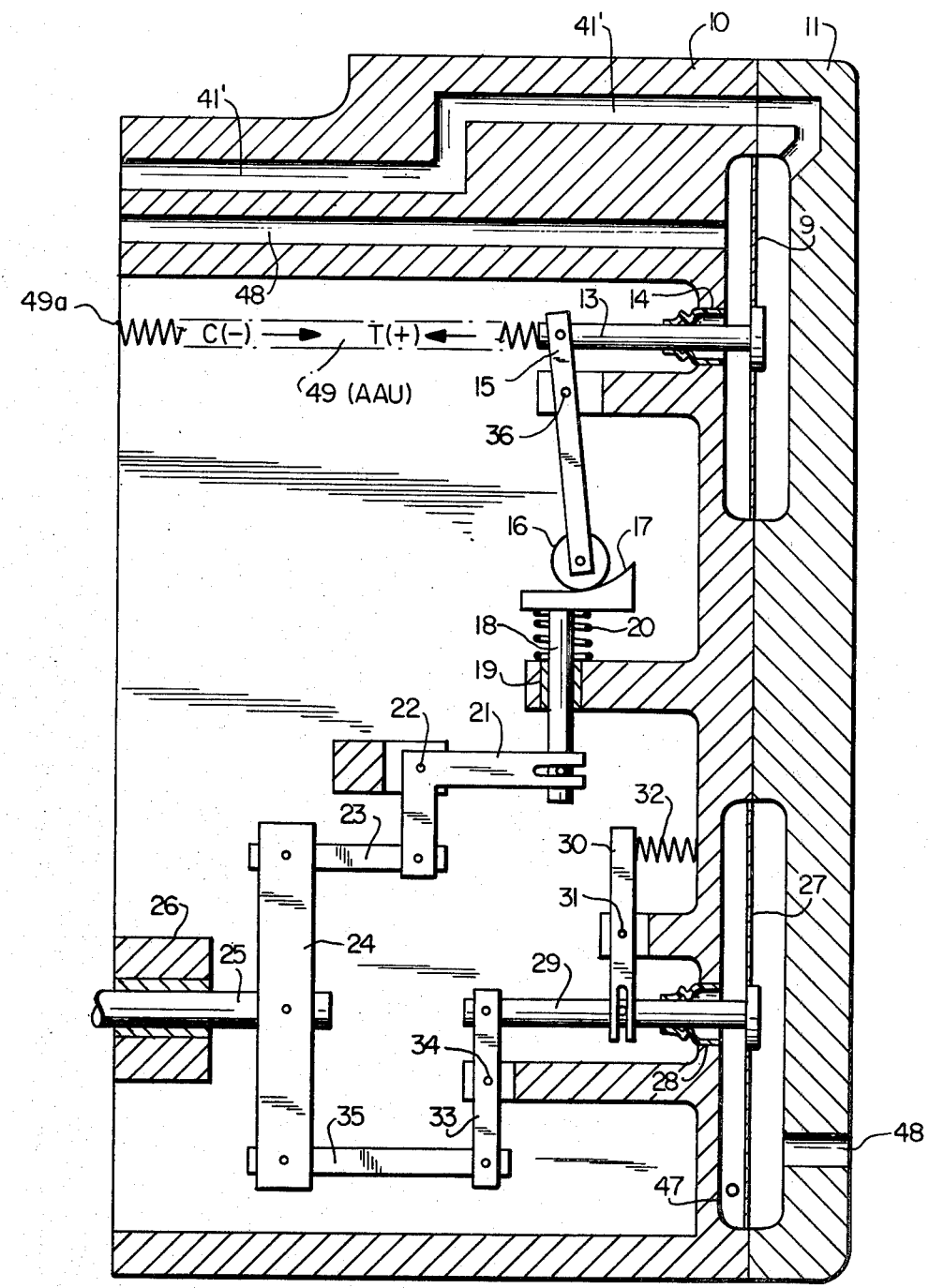
FIG. 3 is a cross-sectional view through a signal processor according to the present invention in a second non-electrical embodiment thereof which selectively can be provided with a summing or a subtracting algebraic addition unit.

In FIG. 3 an alternative of the embodiment to that according to FIG. 2 is shown, identical parts being designated with identical reference numerals. The modification consists chiefly in the selected term being represented by the force of spring 49 acting on the rod 13. Said spring has such length that its force does not vary appreciably as it extends and contracts in the operation of the unit. Duct 41' leads directly to the diaphragm 9, and the by-pass conduit 46 with the restriction 47 is eliminated.

The spring 49 may be either a compression spring, or a tension spring. In the first named case, a compression spring providing a force in the direction of the arrow C will functionally replace the device 42 to 47 of FIG. 2, and thus act as an algebraic addition unit which subtracts from the altered signal a selected term (the power of the spring). In the second case, a tension spring providing a force in the direction of the arrow T will act as an algebraic addition unit which adds to the altered signal a selected term (the power of the spring). In both cases, of course, the left hand fixation point 49a of the spring 49 in the drawing can be made adjustable, in the directions of the arrows C and T, and thus the effective force of the spring can be adjustable.

Figure 4:
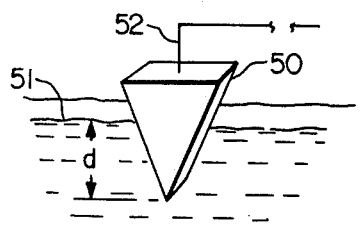
FIG. 4 is an illustration of a level sensor in a specific embodiment.

A sensor which combines the functions of sensing a flow rate and raising the sensed value by a predetermined power is illustrated in FIG. 4. A level sensor 50 floats on the surface 51 of a reservoir containing the liquid being pumped. By conventional means 52, a signal related to the force acting on the lever sensor is transmitted for processing. The level sensor has a wedge-shaped profile and is immersed a distance d under the liquid level 51. The lift buoyance of a body is, as known, proportional to the immersed volume of the body. A wedge-shaped body will have a lift buoyance proportional to $d^2$, i.e., to the square of the immersion depth. With other body shapes practically any other desired relation between the liquid flow and the buoyance lift can be obtained, as the immersion is proportional to the height of the level and this is in turn proportional to the flow.

Ideally, when pumping into or from a reservoir, it is normally desired that the level and the flow be proportional. The same applies also for the case where the level is desired to be constant, but in such a case a compensating circuit is added, such as a proportionally integrating (PI) control circuit.

Figure 5:
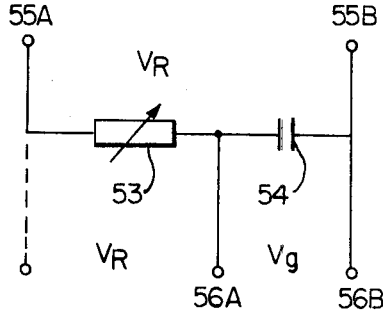
FIG. 5 is a schematic diagram of an electrical circuit for executing several one-step operations.

In FIG. 5 a schematic diagram of an electrical one-step signal processor according to the present invention is shown. The processor comprises a variable resistor 53 and a capacitor 54. For the relation between the different voltage values the following equation is applicable:

$$V_n^2 = V_R^2 + V_q^2 \tag{7a}$$

or in other terms, $$V_q = \sqrt{V_n^2 - V_R^2} \tag{7b}$$

If $V_n$ is proportional to n and $V_R^2$ is proportional to $h_s/H_O$, $V_q$ will be proportional to q.

If the desired or actual value of the pump speed n is known, an alternating current signal of constant frequency having a voltage related to the known value is applied across the terminals 55A and 55B. A converted signal related to the other value of the flow rate q can then be obtained at the terminals 56A and 56B. Alternatively, a signal related to the flow rate can be applied across the terminals 56A and 56B to obtain a signal related to the pump speed at the terminals 55A and 55B. The variable resistor 53 allows adjustment of the selected term in a manner analagous to the adjustability of the setting point 49a in the embodiment of FIG. 3.

It will be understood that the invention is not limited to the embodiments shown, but that it may, within the scope of the idea underlying the invention, be varied within broad limits. Thus, for instance, the positions of the valve flap 49 and of the restriction 47 may be interchanged, a corresponding pressure being supplied to the diaphragm 9. The presently disclosed embodiments are therefore considered in all respects as illustrative and not restrictive. The scope of the invention as indicated by the appended claims rather than the foregoing description, and all changes which come within the meaning and range of equivalency of the claims are therefore intended to be embraced therein.

What is claimed is:

1. A regulator for controlling the speed of a rotary hydrodynamic liquid pump, wherein a pump speed signal is converted into a signal related in value to the flow rate of the pump, comprising:
   means for generating a fluidic signal related in value to a predetermined power of the pump speed;
   a pivotably mounted arm;
   a diaphragm means for applying the fluidic signal to a first end portion of said arm;
   set point providing means including spring means for applying a predetermined force to a second end portion of said arm remote from said first end portion in a direction generally opposite to the force applied by the fluidic signal, whereby a force proportional to the quantity A' acts on said arm, wherein A' is proportional to the difference between the fluidic signal and the predetermined force; and
   means responsive to movement of said arm for generating a flow rate signal which is proportional to a predetermined root of the quantity A'.

2. The regulator of claim 1 wherein said predetermined force is adjustable.

3. A method of regulating the speed of a rotary dynamic pump in dependence on a selected reference parameter, comprising the steps of:
   (a) sensing, by means of a first sensor, one of the acutal and desired values of one of the two parameters, pump speed and flow rate;
   (b) sensing, by means of a second sensor, the other of said values of the other of said parameters;
   (c) generating an altered signal proportional to a selected power of the parameter sensed by the first sensor;
   (d) generating a comparison signal proportional to the parameter sensed by the second sensor;
   (e) algebraically adding a selected term to the altered signal to produce a modified signal;
   (f) extracting a root of a selected power from the modified signal to produce a converted signal;
   (g) feeding said converted and comparison signals into a comparator and obtaining an error signal; and
   (h) feeding said error signal into a speed regulator for a pump.

4. The method of claim 3 wherein at least two of said steps are carried out in a single operation.

5. The method of claim 3 wherein:
   the step (a) of sensing by a first sensor includes sensing one of the actual and desired values of the pump speed;

the step (b) of sensing by a second sensor includes sensing the other of the said values of the flow rate;

the step (c) of generating the altered signal includes raising the quantity sensed by the first sensor to a selected power greater than +1;

the step (e) of algebraically adding includes reducing the altered signal by a selected term to produce the modified signal; and the step (f) of extracting includes extracting a root greater than +1 from the modified signal to produce the converted signal.

6. The method of claim 3 wherein:

the step (a) of sensing by a first sensor includes sensing one of the actual and desired values of the flow rate;

the step (b) of sensing by a second sensor includes sensing the other of the said values of the pump speed;

the step (c) of generating the altered signal includes raising the quantity sensed by the first sensor to a selected power greater than +1;

the step (e) of algebraically adding includes augmenting the altered signal by a selected term to produce the modified signal; and the step (f) of extracting includes extracting a root greater than +1 from the modified signal to produce the converted signal.

7. The method of claim 3 or 6 wherein said first sensor senses the actual value of the flow rate and said second sensor senses the desired value of the pump speed.

8. The method of claim 3 or 6 wherein said first sensor senses the desired value of the flow rate and said second sensor senses the actual value of the pump speed.

9. The method of claim 3 or 6 wherein said first sensor senses the actual value of the pump speed and the second sensor senses the desired value of the flow rate.

10. The method of claim 3 or 6 wherein the first sensor senses the desired value of the pump speed and the second sensor senses the actual value of the flow rate.

11. A signal processing device for automatically regulating the speed of a rotary hydrodynamic pump in dependence on a selected reference parameter, comprising:

first sensing means for sensing one of the actual and desired values of one of two parameters, flow rate and pump speed;

second sensing means for sensing the other of said values of the other said parameter;

a power raising unit adapted to produce from one of the sensed parameters a report signal proportional to a sensed quantity and an altered signal corresponding to a selected power of the sensed quantity;

an algebraic addition unit adapted to receive said altered signal and to modify it into a modified signal by algebraic addition of a selected term;

a root extracting unit adapted to receive said modified signal and to extract therefrom a root greater than +1 to obtain a converted signal;

a comparator unit adapted to receive said converted signal and a comparison signal and to produce therefrom, in a feed-back process, an error signal;

first interconnection means for feeding a preselected value into the power raising unit, for conveying signals therefrom to the algebraic addition unit, for conveying signals from the algebraic unit to the comparator unit, and for conveying an error signal from the comparator unit; and second interconnection means for conveying said comparison signal to the comparator unit.

12. The processing device of claim 11 including at least one electronic means for performing the function of at least two of said units and the interconnection means associated with said at least two units.

13. A regulator for controlling the speed of a rotary hydrodynamic liquid pump, wherein a pump speed signal is converted into a signal related in value to the flow rate of the pump comprising:

a wedge shaped float for sensing the level of a liquid in a container in fluid communication with the pump and for providing a pump speed signal related in value to a predetermined power of the pump speed;

means providing a set point related in value to a ratio between a static head of the pump and a pressure head generated by the pump at zero flow;

means for providing a signal related to the quantity A', wherein A' is proportional to the difference between the pump speed signal and the set point; and means for generating a flow rate signal responsive to a predetermined root of the quantity A' for regulating the speed of the pump.

14. A regulator for controlling the speed of a rotary hydrodynamic liquid pump, wherein, a pump speed signal is converted into a signal related in value to the flow rate of the pump comprising:

means for providing an alternating current pump speed signal related in value to a predetermined power of the pump speed;

a resistor for providing a set point related in value to a ratio between a static head of the pump and a pressure head generated by the pump at zero flow;

a capacitor connected in series with said resistor for generating a flow rate signal responsive to a predetermined root of the quantity A', wherein A' is proportional to the difference between the pump speed signal and the set point; and means for applying said pump speed signal to said series connected resistor and capacitor.

15. The regulator of claim 14 wherein said pump speed signal is related to an AC voltage signal across said resistor and said capacitor and said flow rate signal is related to a voltage across said capacitor.

16. The regulator of claim 14 wherein said resistor is variable.

* * * * *